United States Patent
Tokimasa et al.

(10) Patent No.: US 10,407,066 B2
(45) Date of Patent: Sep. 10, 2019

(54) VEHICLE CONTROL APPARATUS AND VEHICLE CONTROL METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Mitsuhiro Tokimasa, Kariya (JP); Toyoharu Katsukura, Kariya (JP); Yoshihisa Ogata, Kariya (JP); Youhei Masui, Kariya (JP); Taku Sakima, Kariya (JP); Takeshi Nanami, Toyota (JP); Takashi Nishida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 21 days.

(21) Appl. No.: 15/529,930

(22) PCT Filed: Oct. 23, 2015

(86) PCT No.: PCT/JP2015/079933
§ 371 (c)(1),
(2) Date: May 25, 2017

(87) PCT Pub. No.: WO2016/084528
PCT Pub. Date: Jun. 2, 2016

(65) Prior Publication Data
US 2017/0327115 A1 Nov. 16, 2017

(30) Foreign Application Priority Data
Nov. 28, 2014 (JP) .................. 2014-242233

(51) Int. Cl.
*B60W 30/16* (2012.01)
*B60W 30/14* (2006.01)
(Continued)

(52) U.S. Cl.
CPC ............ *B60W 30/16* (2013.01); *B60R 21/00* (2013.01); *B60W 10/06* (2013.01); *B60W 10/10* (2013.01);
(Continued)

(58) Field of Classification Search
None
See application file for complete search history.

(56) References Cited

U.S. PATENT DOCUMENTS

| 6,094,616 A | 7/2000 | Andreas et al. |
| 2008/0040039 A1* | 2/2008 | Takagi .................. G01S 17/936 701/300 |
| 2016/0200321 A1* | 7/2016 | Yamada ................ B60W 10/06 701/96 |

FOREIGN PATENT DOCUMENTS

| JP | 2000-343980 A | 12/2000 |
| JP | 2004-220341 A | 8/2004 |

(Continued)

*Primary Examiner* — Lail A Kleinman
(74) *Attorney, Agent, or Firm* — Knobbe, Martens, Olson & Bear, LLP (57) ABSTRACT

A vehicle control apparatus mounted to an own vehicle to control the own vehicle according to a position of other vehicle ahead of the own vehicle is provided. The device includes a setting means setting a parameter indicating a position of the other vehicle relative to the own vehicle in a lateral direction perpendicular to the path of the own vehicle, a determination means determining whether the other vehicle is in the path of the own vehicle based on the parameter, a detection means detecting whether a relative movement has been made in the lateral direction by at least one of the own vehicle and the other vehicle, and a correc- (Continued)

tion means correcting the parameter when a relative movement has been made in the lateral direction.

10 Claims, 6 Drawing Sheets

(51) Int. Cl.
   *B60W 30/12*   (2006.01)
   *B60W 10/18*   (2012.01)
   *B60W 10/10*   (2012.01)
   *B60W 10/06*   (2006.01)
   *G08G 1/16*   (2006.01)
   *G01S 13/16*   (2006.01)
   *B60R 21/00*   (2006.01)
   *G01S 13/93*   (2006.01)

(52) U.S. Cl.
   CPC ............ *B60W 10/18* (2013.01); *B60W 30/12* (2013.01); *B60W 30/14* (2013.01); *G01S 13/931* (2013.01); *G08G 1/16* (2013.01); *G08G 1/166* (2013.01); *G08G 1/167* (2013.01); *B60T 2201/08* (2013.01); *B60W 2420/52* (2013.01); *B60W 2520/10* (2013.01); *B60W 2540/04* (2013.01); *B60W 2550/10* (2013.01); *B60W 2550/30* (2013.01); *B60W 2550/302* (2013.01); *B60W 2550/306* (2013.01); *B60W 2550/308* (2013.01)

(56) References Cited

FOREIGN PATENT DOCUMENTS

| | | |
|---|---|---|
| JP | 2006-327531 A | 12/2006 |
| JP | 2011-065219 A | 3/2011 |

\* cited by examiner

VEHICLE CONTROL APPARATUS AND VEHICLE CONTROL METHOD

CROSS-REFERENCE TO RELATED APPLICATION

This application is based on and claims the benefit of priority from earlier Japanese Patent Application No. 2014-242233 filed on Nov. 28, 2014 the descriptions of which is incorporated herein by reference.

TECHNICAL FIELD

The present disclosure relates to a vehicle control technique mounted to a vehicle for detecting other vehicle ahead of the vehicle.

BACKGROUND ART

Vehicle control apparatuses that are conventionally known use search waves such as millimeter waves when controlling the vehicles equipped with the devices. Specifically, such a vehicle control apparatus transmits millimeter waves over a predetermined angular range around the own vehicle, detects the reflected waves to detect the location of other vehicle, and controls the own vehicle to follow the detected other vehicle.

This type of vehicle control apparatus is disclosed in PTL 1. The vehicle control apparatus disclosed in PTL 1 detects other vehicles traveling in the own lane (the lane which the own vehicle is traveling) and an adjacent lane (a lane adjacent to the own lane), and determines whether other vehicle traveling in the adjacent lane has entered the own lane. The vehicle control apparatus disclosed in PTL 1 also determines whether other vehicle traveling in the own lane has departed from the own lane. In this case, when the other vehicle traveling in the own lane moves in a lateral direction and starts a behavior of departing from the own lane, early departure of the other vehicle from the detection range is prompted by reducing the width of detecting the position of the other vehicle. On the other hand, when other vehicle traveling in an adjacent lane moves in a lateral direction to enter the own lane, early entry of the other vehicle into the detection range is prompted by increasing the width of detecting the position of the other vehicle.

CITATION LIST

Patent Literature

[PTL 1] U.S. Pat. No. 6,094,616 B

SUMMARY OF THE INVENTION

Technical Problem

According to the vehicle control apparatus disclosed in PTL 1, departure of other vehicle from the own lane can be prompted by changing the width of detecting the position of the other vehicle. Entry of other vehicle into the own lane can also be prompted. However, entry of other vehicle into the own lane is gradual. Also, departure of other vehicle from the own lane is gradual. Thus, when determining the entry of other vehicle into the own lane, there will be a response delay. When determining departure of other vehicle from the own lane, there will also be a response delay.

An object of the present disclosure is to provide a vehicle control technique that can quickly determine whether other vehicle is in the path of the own vehicle.

Solution to Problem

The present disclosure is a vehicle control apparatus mounted to an own vehicle to control the own vehicle according to a position of other vehicle ahead of the own vehicle. The apparatus includes a setting means, a determination means, a detection means, and a correction means. The setting means sets a parameter indicating a position of the other vehicle relative to the own vehicle in a lateral direction perpendicular to a path of the own vehicle. The determination means determines whether the other vehicle is in the path of the own vehicle based on the parameter. The detection means detects whether a relative movement in the lateral direction has been made by at least one of the own vehicle and the other vehicle. The correction means corrects the parameter when a relative movement in the lateral direction is detected.

Advantageous Effects of the Invention

When a parameter that is set according to the relative position of the own vehicle and other vehicle is used to determine whether other vehicle traveling ahead of the own vehicle is in the path of the own vehicle, the parameter changes with the relative movement of the own vehicle or other vehicle in the lateral direction. The change of the parameter is gradual. Thus, when determining whether other vehicle is in the path of the own vehicle, there may be a delay in the determination. In this regard, the vehicle control apparatus of the present disclosure with the above configuration corrects the parameter when a relative movement has been made in the lateral direction by at least one of the own vehicle and other vehicle. Thus, the vehicle control apparatus of the present disclosure can improve responsiveness in making a determination as to whether other vehicle is in the path of the own vehicle, when a relative movement is made of the own vehicle or other vehicle in the lateral direction.

DESCRIPTION OF THE EMBODIMENTS

Some embodiments will be described hereinafter with reference to the drawings. The same or equivalent parts in the embodiments described below are assigned with the same reference signs in the drawings, and an earlier description should be referred to regarding those parts which are assigned with the same reference signs.

<First Embodiment>

A first embodiment of the present disclosure will be described with reference to the drawings. A vehicle control apparatus provided with an object detecting device is mounted to a vehicle, with an ACC (adaptive cruise control) function being imparted. The vehicle control apparatus uses the ACC function to allow the own vehicle to perform following travel in such a way that the distance between the own vehicle and other vehicle detected by the object detecting device becomes a target inter-vehicle distance suitable for the vehicle speed. When other vehicle is not detected, the vehicle control apparatus controls the own vehicle to travel at a set target speed.

Figure 1:
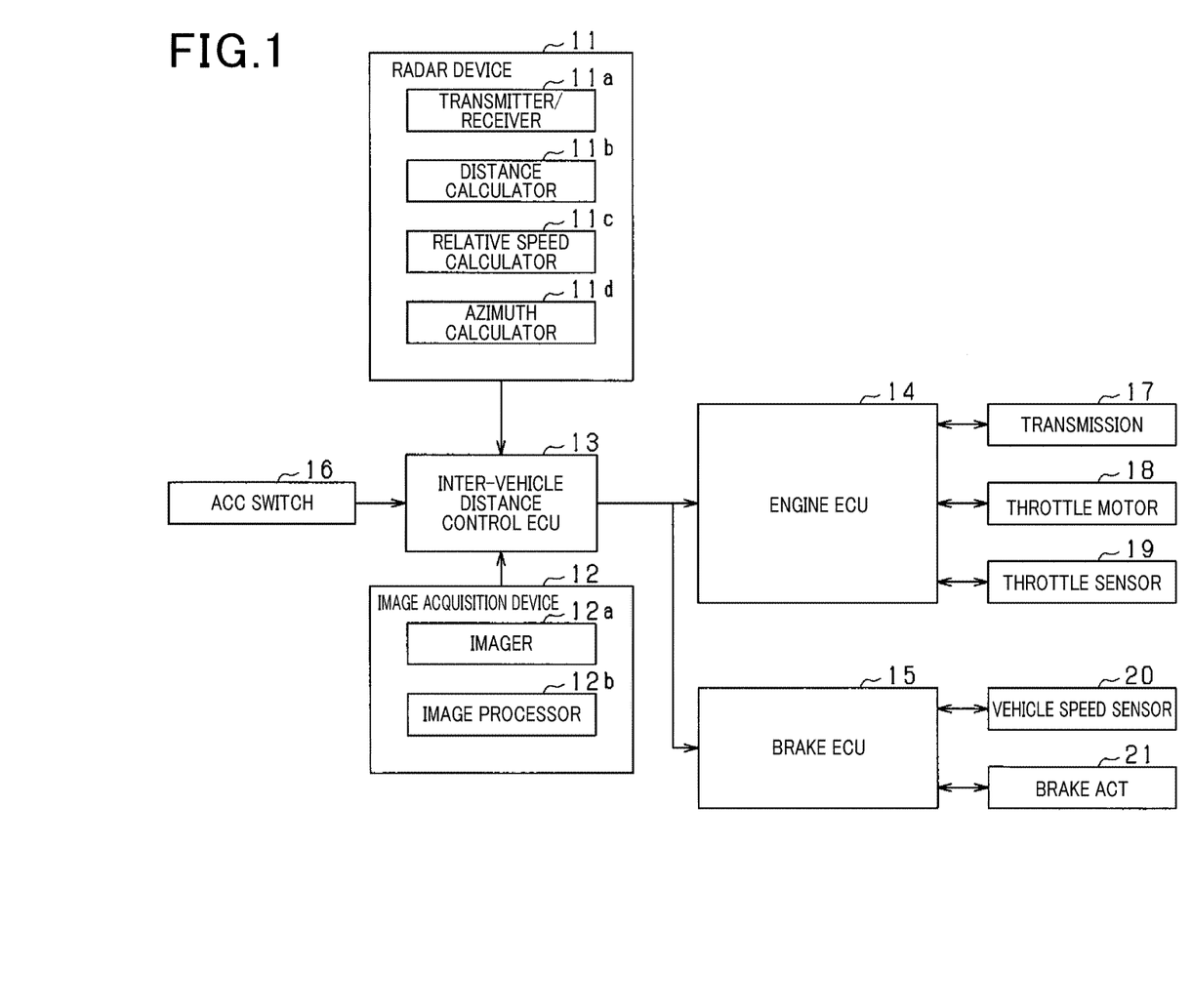
FIG. 1 is a configuration diagram generally illustrating a vehicle control apparatus.

In FIG. 1, the vehicle control apparatus of the present embodiment includes a radar device 11, an image acquisition device 12, an inter-vehicle distance control ECU 13, an engine ECU 14, and a brake ECU 15. In the vehicle control apparatus, the inter-vehicle distance control ECU 13 serves as an object detecting device using information obtained from the radar device 11 and the image acquisition device 12, and cooperates with the engine ECU 14 and the brake ECU 15 to control the inter-vehicle distance.

The radar device 11 and the image acquisition device 12 are connected to the ECUs 13 to 15 via an on-vehicle network so that they can communicate with each other. The inter-vehicle distance control ECU 13 is connected to an ACC switch 16. The engine ECU 14 is connected to a transmission 17, a throttle motor 18, and a throttle sensor 19. The brake ECU 15 is connected to a vehicle speed sensor 20 and a brake ACT (actuator) 21. These devices are connected via a dedicated line used such as for serial communication.

The radar device 11, the image acquisition device 12, and the ECUs 13 to 15 are information processors each including components such as a microcomputer and a wire harness interface. The microcomputer includes components, such as CPU, ROM, RAM, I/O port, and CAN communication device.

The radar device 11 detects a distance, a relative speed, and a relative position for each of other vehicles and provides the detected results to the inter-vehicle distance control ECU 13. The image acquisition device 12 includes an image capturing means for capturing an image such as of an object. The image acquisition device 12 captures an image of the surroundings of the own vehicle to apply predetermined processing to the captured image, and provides the processing results to the inter-vehicle distance control ECU 13.

The inter-vehicle distance control ECU 13 uses, as a basis, information on other vehicle, current speed, current acceleration, etc., transmitted from the radar device 11 and the image acquisition device 12 to thereby transmit an acceleration instruction for instructing an acceleration of the own vehicle to the engine ECU 14 and the brake ECU 15.

The ACC switch 16 receives the driver's manipulation of ACC. Upon reception of the manipulation, the inter-vehicle distance control ECU 13 transmits an acceleration instruction to the engine ECU 14 and the brake ECU 15. The driver's manipulation of ACC includes switching on/off of ACC, switching between a mode maintaining a predetermined inter-vehicle distance and a mode maintaining a predetermined vehicle speed, and instructing a vehicle speed.

The engine ECU 14 controls the throttle motor 18 while monitoring the throttle opening detected by the throttle sensor 19. For example, based on table data in which throttle openings are correlated to vehicle speeds and acceleration instructions, the engine ECU 14 determines the throttle opening according to the acceleration instruction received from the inter-vehicle distance control ECU 13 and the current speed. Also, the engine ECU 14 determines whether gear shifting is necessary (necessity of gear shifting) based on the vehicle speed and the throttle opening. If necessary, the engine ECU 14 instructs the transmission 17 to set a gear position.

The brake ECU 15 applies braking to the own vehicle by controlling the valve opening/closing and valve position of the brake ACT 21. The brake ACT 21 controls the acceleration (or deceleration) of the own vehicle by increasing, maintaining, or reducing the wheel cylinder pressure of each wheel using a pressure produced by a pump in a working fluid (e.g., oil). The brake ECU 15 applies braking to the own vehicle according to the acceleration instruction sent from the inter-vehicle distance control ECU 13.

The radar device 11 serves as a first detecting means which detects the position of other vehicle relative to the own vehicle. For example, the radar device 11 transmits a millimeter-band high frequency signal and detects the position of an object within a detection range that is a region falling in a predetermined detection angle in a forward direction of the own vehicle. Specifically, the radar device 11 includes a transmitter/receiver 11a and a distance calculator 11b. The transmitter/receiver 11a transmits search waves, and receives the reflected waves with a plurality of antennas. The distance calculator 11b calculates the distance between the own vehicle and other vehicle. Further, the radar device 11 includes a relative speed calculator 11c and an azimuth calculator 11d. The relative speed calculator 11c calculates the relative speed of the own vehicle and other vehicle. The azimuth calculator 11d calculates the azimuth of other vehicle with respect to the own vehicle. The distance calculator 11b calculates the distance between the own vehicle and other vehicle based on the transmission time point of the search waves and the reception time point of the reflected waves. The relative speed calculator 11c calculates a relative speed based on the frequency of the waves reflected by other vehicle (the frequency that has been changed by Doppler effect). The azimuth calculator 11d calculates the azimuth of other vehicle based on the phase difference of the reflected waves received by the plurality of antennas. It should be noted that the radar device 11 can specify the position of other vehicle relative to the own vehicle if the location and the azimuth of the other vehicle can be calculated. The radar device 11 periodically transmits search waves towards other vehicle and, periodically receives the reflected waves from the other vehicle. Also, the radar device 11 periodically calculates the reflection position at which the search waves have been reflected and, periodically calculates the relative speed between the own vehicle and other vehicle. As a result, the radar device 11 sends information including at least a reflection position (position based on the reflected waves) as first detection information, to the inter-vehicle distance control ECU 13.

The image acquisition device 12 includes an imager 12a (imaging means). The imager 12a is a single-lens imaging device, such as a CCD camera, CMOS image sensor, or near-infrared camera. The imager 12a is mounted to the vehicle so as to be located at the center of the vehicle in the vehicle width direction at a predetermined level to capture a bird's eye view image of an area ahead of the vehicle, spreading at a predetermined angle (the detection range of the radar device 11). An image processor 12b extracts feature points (feature points indicating presence of other vehicle) from the image captured by the imager 12a. Specifically, the image processor 12b extracts edge points from the image on the basis of the luminance information of the image and performs Hough transform for the extracted edge points. In the Hough transform, points extracted as feature points include, for example, points on a straight line that are a plurality of successive edge points, or points at each of which straight lines cross at right angles. It should be noted that the image acquisition device 12 captures an image and extracts feature points at a control cycle that is the same as or different from that of the radar device 11. As a result, the image acquisition device 12 sends information, including at least the results of feature point extraction (positions based on the captured image within the detection range), as second detection information to the inter-vehicle distance control ECU 13.

Figure 2:
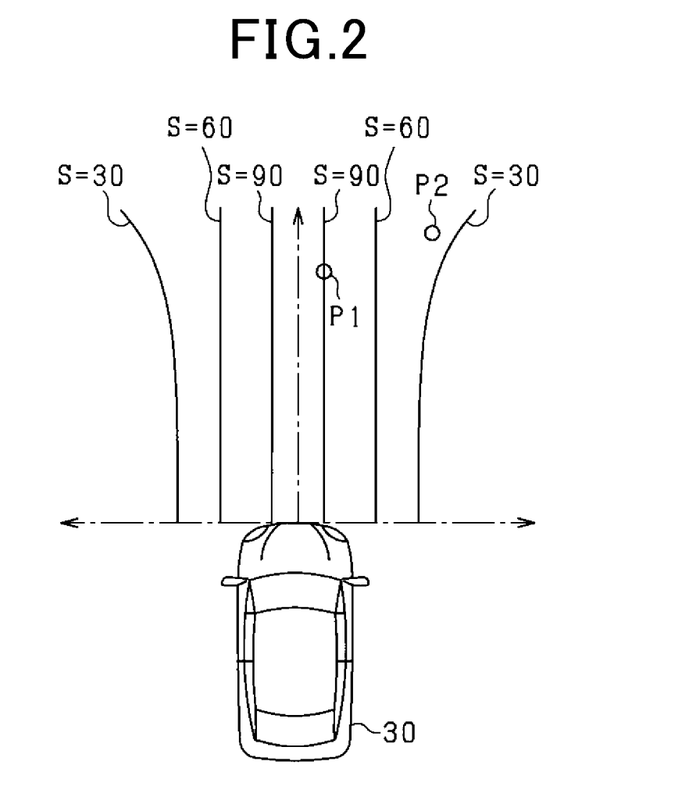
FIG. 2 is a diagram illustrating a probability map of the own lane.

Next, processing performed by the inter-vehicle distance control ECU 13 of the present embodiment will be described (processing for determining whether other vehicle is present in the own lane). For each of other vehicles in the traveling direction of the own vehicle, the inter-vehicle distance control ECU 13 uses an own lane probability S as a parameter for determining whether other vehicle is present in the lane which the own vehicle is traveling. Referring to FIG. 2, the own lane probability S will be described.

In the present embodiment, a probability map is set as a determination region, extending over a predetermined range on a virtual plane (virtual coordinate space) in front of the own vehicle 30 in the traveling direction to correlate other vehicles with own lane probabilities S. The determination region is used for determining whether other vehicle is present in the path of an own vehicle 30. In this case, the inter-vehicle distance control ECU 13 serves as a setting means that sets a parameter indicating the position of other vehicle relative to the own vehicle 30 in a lateral direction perpendicular to the path of the own vehicle 30. The probability map is designed to be located within a range detectable by the radar device 11. Own lane probabilities S are correlated with positions (coordinates) on the probability map. The inter-vehicle distance control ECU 13 maps the position of other vehicle relative to the own vehicle 30 into the coordinate space of the probability map to thereby determine the own lane probability S of the other vehicle with respect to the own vehicle 30. FIG. 2 shows an example of the probability map in which own lane probabilities S ranging from 30 to 90 are correlated in a virtual coordinate space where relative positions of other vehicles ahead of the own vehicle 30 are indicated. As shown in FIG. 2, a higher own lane probability S (S=90) is set at position closer to the path of the own vehicle 30 (closer to the centerline of the own lane), and the set value gradually decreases at position farther from the path of the own vehicle 30 in a lateral direction. In this way, the own lane probability S on the probability map is set to gradually decrease in the lateral direction perpendicular to the path of the own vehicle 30. Also, the own lane probability S is set such that the range of correlated positions is partially enlarged more at position farther from the own vehicle 30. The reason for the above settings is that at position farther from the own vehicle 30, the error in the position of the object detected by the radar device 11 increases more. The inter-vehicle distance control ECU 13 calculates the own lane probability S of the detected other vehicle based on the position of the other vehicle and the set probability map, and then compares the calculated own lane probability S with a predetermined threshold Th. Then, when the own lane probability S is equal to or greater than the threshold Th, the inter-vehicle distance control ECU 13 selects the other vehicle detected by the radar device 11 as a preceding vehicle for use in the following control of the own vehicle 30. When the own lane probability S is smaller than the threshold Th, the inter-vehicle distance control ECU 13 deselects the other vehicle detected by the radar device 11 if the other vehicle has already been selected as a preceding vehicle for use in the following control of the own vehicle 30.

For example, on the probability map shown in FIG. 2, when the position of other vehicle is detected at a position P1 near the path of the own vehicle 30 (near the centerline of the own lane), the own lane probability S is 90. When the position of other vehicle is detected at a position P2 shifted in a lateral direction from the path of the own vehicle 30, the own lane probability S is about 40. In this situation, when the threshold Th is set to 50, for example, the vehicle at the position P1 is selected as a preceding vehicle since the own lane probability S is equal to or greater than the threshold Th. The vehicle at the position P2 will not be selected as a preceding vehicle since the own lane probability S is below the threshold Th (the vehicle at the position P2, if it already been selected as a preceding vehicle, is deselected).

Although specific values of the own lane probability S are shown on the probability map of FIG. 2, these are merely examples. That is, any probability map may be used as long as the own lane probabilities S are set such that other vehicle is more likely to be selected as a preceding vehicle as the position of the other vehicle relative to the own vehicle 30 in the lateral direction becomes closer to the path of the own vehicle 30 (the centerline of the own lane).

Figure 3A:
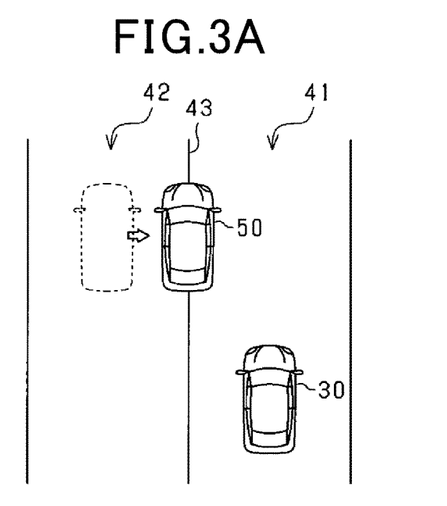
FIG. 3A is a diagram illustrating an example of lateral movement in the entering direction.
Figure 3B:
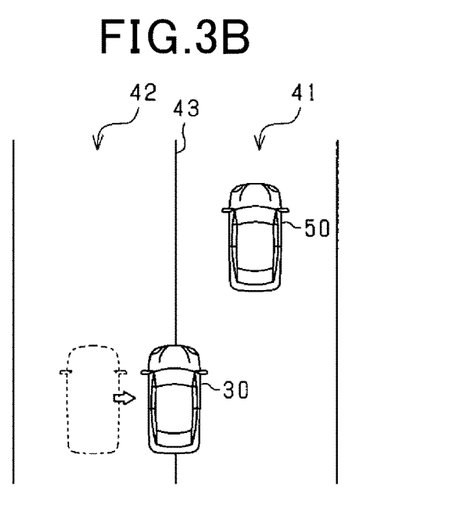
FIG. 3B is a diagram illustrating another example of lateral movement in the entering direction.
Figure 4A:
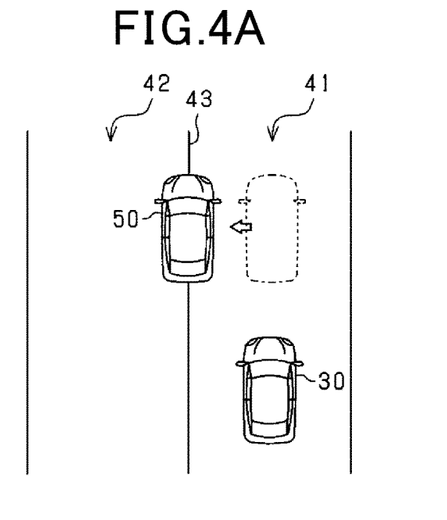
FIG. 4A is a diagram illustrating an example of lateral movement in the departure direction.
Figure 4B:
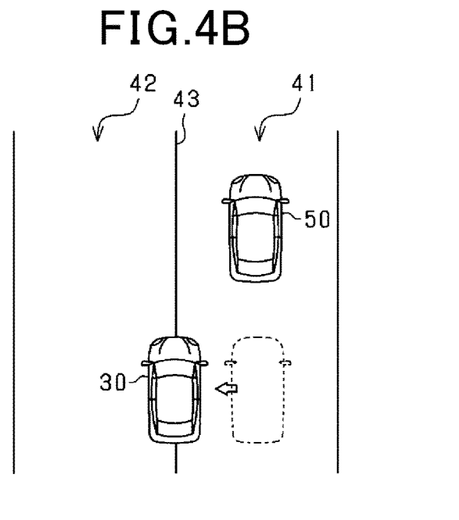
FIG. 4B is a diagram illustrating another example of lateral movement in the departure direction.

In determining whether other vehicle should be selected as a preceding vehicle using the own lane probability S, change in the driving behavior of the vehicle, such as lane change, is required to be considered. This is because when the own vehicle 30 or other vehicle changes lanes, the position of the other vehicle relative to the own vehicle 30 changes greatly in the coordinate space of the probability map, and accordingly the own lane probability S changes greatly. FIGS. 3A and 3B shows examples in which the own lane probability S increases with the change in the driving behavior of a vehicle. FIGS. 4A and 4B shows examples in which the own lane probability S decreases.

FIG. 3A shows an example in which the own vehicle 30 is traveling in a first lane 41, and other vehicle 50 traveling in a second lane 42 changes lanes by crossing over a white line (lane separator line) 43 for interruption (entry) into the first lane 41 and is positioned in front of the own vehicle 30 traveling in the first lane 41. In such a case, since the other vehicle 50 is moving towards the front position of the own vehicle 30 in the traveling direction, the own lane probability S of the other vehicle 50 increases with the movement thereof.

FIG. 3B shows an example in which other vehicle 50 is traveling in the first lane 41, and the own vehicle 30 traveling in the second lane 42 changes lanes by crossing over the white line 43 for entry into the first lane 41 and is positioned rear of the other vehicle 50 traveling in the first lane 41. In such a case, with the entry of the own vehicle 30 into the first lane 41, the lateral relative position of the own vehicle 30 and the other vehicle 50 traveling ahead of the own vehicle 30 become closer. Thus, the own lane probability S increases with the movement of the own vehicle 30.

FIG. 4A shows an example in which the own vehicle 30 is traveling in the first lane 41, and other vehicle 50 traveling ahead of the own vehicle 30 on the first lane 41 changes lanes by crossing over the white line 43 for departure from the first lane 41. In such a case, since the other vehicle 50 is moving in a direction departing from the position in front of the own vehicle 30 in the traveling direction, the own lane probability S of the other vehicle 50 decreases with the movement thereof.

FIG. 4B shows an example in which other vehicle 50 is traveling in the first lane 41, and the own vehicle 30 traveling behind the other vehicle 50 on the first lane 41 changes lanes by crossing over the white line 43 for departure from the first lane 41. In such a case, with the entry of the own vehicle 30 into the first lane 41, the lateral relative position of the own vehicle 30 and the other vehicle 50 traveling ahead of the own vehicle 30 depart from each other. Thus, the own lane probability S decreases with the movement of the own vehicle 30.

Accordingly, in the lane changes shown in FIGS. 3A and 3B, the own lane probability S gradually increases with the lateral movement of the own vehicle 30 or other vehicle 50. In the lane changes shown in FIGS. 4A and 4B, the own lane probability S gradually decreases with the lateral movement of the own vehicle 30 or other vehicle 50. Thus, in the lane changes shown in FIGS. 3 and 4, selection and deselection of the preceding vehicle cannot be done immediately after start of the vehicle's movement. Accordingly, responsiveness to selection and deselection of the preceding vehicle is lowered.

Thus, in the present embodiment, when a relative movement in a lateral direction (hereinafter refer to as lateral relative movement) of the own vehicle 30 or other vehicle 50 in the entering direction is detected as shown in FIGS. 3A and 3B, a correction value N indicating an entry probability is added to the own lane probability S calculated based on the probability map. That is, in the present embodiment, the own lane probability S is corrected when a vehicle makes a lateral relative movement in the entering direction. The lateral relative movement in the entering direction in this case is detected, based on the change in the position of the other vehicle 50 detected by the radar device 11. That is, the inter-vehicle distance control ECU 13 of the present embodiment monitors the amount of lateral movement (the amount of relative movement in a lateral direction) of the other vehicle 50 relative to the own vehicle 30, based on the detected value derived from the radar device 11. The inter-vehicle distance control ECU 13 determines whether a vehicle has made a lateral relative movement, on the basis of whether the amount of movement per unit time has exceeded a predetermined value. Further, when the correction value N is added to the own lane probability S (when the own lane probability S is corrected), the inter-vehicle distance control ECU 13 performs a process. The process performed when the vehicle's lateral movement is continuing is different from the process performed when the lateral movement has finished. Specifically, when the vehicle's lateral movement is continuing, the correction value N is set to a first predetermine value N1, and when the lateral movement has finished thereafter, the correction value N is gradually reduced from the first predetermined value N1. That is, there may be a situation where the own lane probability S exceeds the threshold Th by the addition of the correction value N upon detection of a vehicle's lateral movement, and other vehicle 50 is selected as a preceding vehicle. In this situation, the own lane probability S at the finishing position of the lateral movement of the other vehicle 50 becomes lower than the threshold Th. Thus, in the present embodiment, when the vehicle's lateral movement has finished, the correction value N added to the own lane probability S is gradually reduced so that the selected preceding vehicle is not deselected immediately.

Similarly, when a lateral relative movement of the own vehicle 30 or other vehicle 50 in a departing direction is detected as shown in FIGS. 4A and 4B, a correction value N indicating a departure probability is added to the own lane probability S calculated based on the probability map (the own lane probability S is corrected). Since the own lane probability S decreases when a lateral relative movement of a vehicle in the departing direction is detected, the correction value N added to the own lane probability S is set to a negative value.

It should be noted that, when the own lane probability S calculated based on the probability map is sufficiently smaller than the threshold Th, this means that the lateral relative positions of the own vehicle 30 and other vehicle 50 are sufficiently alienated from each other (the own vehicle 30 and other vehicle 50 are sufficiently laterally distanced from each other). In such a case, if the other vehicle 50 is immediately selected as a preceding vehicle upon detection of a lateral movement of the other vehicle 50, the selection is highly likely to be an erroneous selection. When the value of the own lane probability S is sufficiently larger than the threshold Th, this means that other vehicle 50 is present in the path of the own vehicle 30. In such a case, if the other vehicle 50 is immediately excluded from preceding vehicles upon detection of a lateral movement of the other vehicle 50, the exclusion is highly likely to be an erroneous exclusion. Accordingly, the first predetermined value N1 set as the correction value N for the own lane probability S may be set to a lower value than the threshold Th (e.g., around 20 to 30 when the threshold Th is 50). While the lateral movement is continuing, selection as a preceding vehicle or exclusion from preceding vehicles may be ensured to be conducted.

Figure 5:
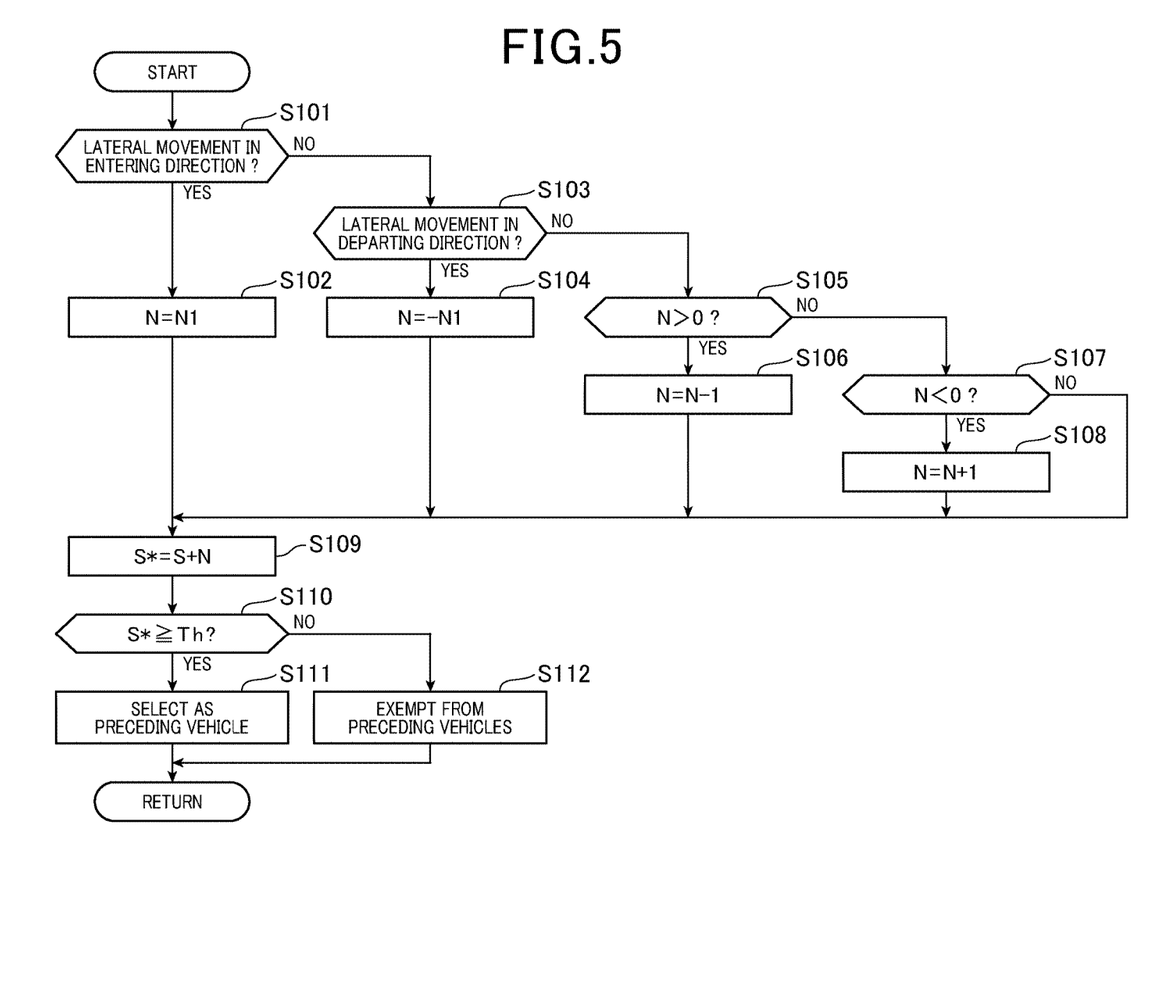
FIG. 5 is a flow diagram illustrating a process according to a first embodiment.

FIG. 5 is a flow diagram illustrating a process performed by the inter-vehicle distance control ECU 13 of the present embodiment. This process is performed for all of other vehicles 50 detected by the radar device 11, and repeated at a predetermined control cycle.

First, the inter-vehicle distance control ECU 13 of the present embodiment determines whether a lateral relative movement of the own vehicle 30 or other vehicle 50 in the entering direction has been made (S101). As described above, the process in S101 (detection of the vehicle's lateral movement) monitors an amount of lateral movement of the other vehicle 50 relative to the own vehicle 30, and determines whether a lateral relative movement in the entering direction has been made, on the basis of whether the amount of movement per unit time has exceeded a predetermined value. If it is determined that a lateral movement in the entering direction has been made (YES in S101), the inter-vehicle distance control ECU 13 sets the correction value N of the own lane probability S to the first predetermined value N1 (N=N1) (S102). If the determination is the same as in the previous control cycle, it means that the correction value N of the own lane probability S has been maintained at the first predetermined value N1. If it is determined that a lateral movement in the entering direction has not been made (NO in S101), the inter-vehicle distance control ECU 13 determines whether a lateral relative movement has been made by the own vehicle 30 or other vehicle 50 in a departing direction (S103). Similarly to the process of S101, the process of S103 (detection of the vehicle's lateral movement) monitors an amount of lateral movement by the other vehicle 50 relative to the own vehicle 30, and determines whether a lateral relative movement in a departing direction has been made, on the basis of whether the amount of movement per unit time has exceeded a predetermined value. If it is determined that a lateral movement in a departing direction has been made (YES in S103), the inter-vehicle distance control ECU 13 sets the correction value N of the own lane probability S to a value with a sign inverse of the first predetermined value N1 (N=−N1) (S104).

If it is determined that a lateral movement in a departing direction has not been made (NO in S103), the inter-vehicle distance control ECU 13 determines whether the correction value N of the own lane probability S is larger than 0 (S105). If it is determined that the correction value N of the own lane probability S is larger than 0 (YES in S105), the inter-vehicle distance control ECU 13 reduces the correction value N of the own lane probability S (N=N−1) (S106). The reason why the process of S105 (reduction of the correction value N) is performed is that the period in which the correction value N of the own lane probability S is determined to be larger than 0 corresponds to the gradual reduction period of the correction value N which follows detection of a lateral movement in an entering direction. If it is determined that the correction value N of the own lane probability S is not larger than 0 (NO in S105), the inter-vehicle distance control ECU 13 determines whether the correction value N of the own lane probability S is smaller than 0 (S107). If it is determined that the correction value N of the own lane probability S is smaller than 0 (YES in S107), the inter-vehicle distance control ECU 13 increases the correction value N of the own lane probability S (N=N+1) (S108). The reason why the process of S108 (increasing the correction value N) is performed is that the period in which the correction value N of the own lane probability S is determined to be smaller than 0 corresponds to the gradual reduction period of the correction value N which follows detection of a lateral movement in a departing direction.

After determining (setting) the correction value N of the own lane probability S through the above processing steps, the inter-vehicle distance control ECU 13 adds the correction value N to the own lane probability S calculated using the probability map to calculate a corrected own lane probability (hereinafter referred to as corrected probability) S* (S*=S+N) (S109). Since the correction value N of the own lane probability S is a positive value during the gradual reduction period of the correction value N which follows the vehicle's lateral movement in the entering direction, the corrected probability S* becomes larger than the own lane probability S (S*>S). On the other hand, since the correction value N of the own lane probability S is a negative value during the gradual increase period of the correction value N which follows the vehicle's lateral movement in the departing direction, the corrected probability S* becomes smaller than the own lane probability S (S*<S).

Then, the inter-vehicle distance control ECU 13 compares the calculated corrected probability S* with the threshold Th and determines whether the corrected probability S* is equal to or greater than the threshold Th (S110). If it is determined that the corrected probability S* is equal to or greater than the threshold Th (YES in S110), the inter-vehicle distance control ECU 13 selects the other vehicle 50 corresponding to the corrected probability S* (selected target vehicle) as a preceding vehicle (S111). In the process of S111 (selection of preceding vehicle), if a selection target vehicle has already been selected as a preceding vehicle, selection of that preceding vehicle is maintained. If it is determined that the corrected probability S* is smaller than the threshold Th (NO in S110), the inter-vehicle distance control ECU 13 excludes the other vehicle 50 corresponding to the corrected probability S* (excluded target vehicle) from preceding vehicles (S112). In the process of S112 (exclusion from preceding vehicle), if an exclusion target vehicle has not been selected as a preceding vehicle, the non-selected state is maintained. Thus, if the exclusion target vehicle has been selected as a preceding vehicle in the process of S112, the exclusion target vehicle is excluded from preceding vehicles. The inter-vehicle distance control ECU 13 terminates the sequence of processing steps. The inter-vehicle distance control ECU 13 serves as a detection means detecting whether a lateral relative movement has been made by at least one of the own vehicle 30 and other vehicle 50 by performing the processing steps of S101 and S103. Further, when a lateral relative movement has been made, the inter-vehicle distance control ECU 13 serves as a correction means correcting a parameter (own lane probability S) indicating the lateral position of the other vehicle 50 relative to the own vehicle 30 by performing the processing steps of S102 and S104 to S109. The inter-vehicle distance control ECU 13 serves as a determination means determining whether other vehicle 50 is in the path of the own vehicle 30 by performing the process of S110 and using a parameter (own lane probability S).

Figure 6:
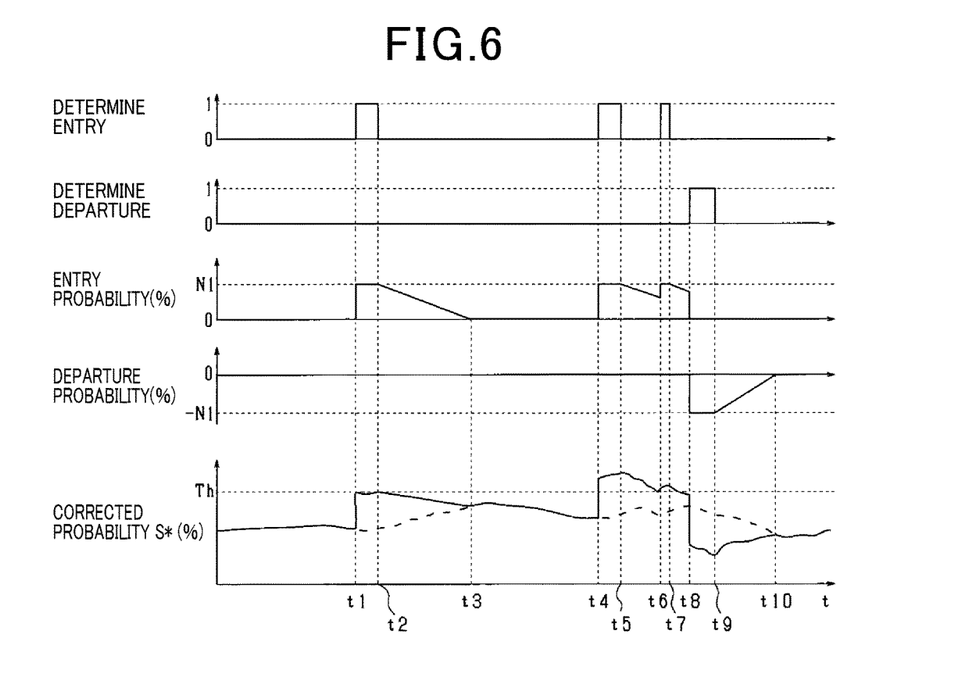
FIG. 6 is a time diagram illustrating the case where the process according to the first embodiment is executed.

FIG. 6 shows a time diagram illustrating an example of the case where the inter-vehicle distance control ECU 13 of the present embodiment has performed the processing steps. In FIG. 6, the solid line indicates the corrected probability S* and the broken line indicates the own lane probability S before correction.

First, at time t1, the inter-vehicle distance control ECU 13 detects a lateral relative movement of the own vehicle 30 or other vehicle 50 in the entering direction and determines the occurrence of entry. The correction value N indicating an entry probability is set to the first predetermined value N1 in this case. The inter-vehicle distance control ECU 13 adds this correction value N to the own lane probability S to calculate the corrected probability S*. In the scenario of FIG. 6, other vehicle 50 is traveling being distanced from the front position of the own vehicle 30, and therefore the own lane probability S before correction is relatively low and the corrected probability S* is below the threshold Th. Thus, the other vehicle 50 is not selected as a preceding vehicle. The lateral relative movement of the own vehicle 30 or the other vehicle 50 in the entering direction continues until time t2. In this situation, the inter-vehicle distance control ECU 13 gradually reduces the correction value N indicating the entry probability, from time t2 until time t3 (gradually reduces the correction value N).

Then, the inter-vehicle distance control ECU 13 determines the occurrence of entry again at time t4. At time t4, addition of the correction value N causes the own lane probability S, which indicates a value larger than that at time t1, to exceed the threshold Th. In response, the inter-vehicle distance control ECU 13 selects the other vehicle 50 as a preceding vehicle. The entry determination continues until time t5 and ends at time t5. At this point, the inter-vehicle distance control ECU 13 gradually reduces the correction value N indicating an entry probability (gradually reduces the correction value N). When the occurrence of entry is determined again at time t6 falling in the gradual reduction period, the inter-vehicle distance control ECU 13 sets the correction value N indicating an entry probability to the first predetermined value N1. After the entry determination continues until time t7, the inter-vehicle distance control ECU 13 determines the occurrence of departure at time t8 falling in the gradual reduction period. As a result, the correction value N indicating a departure probability should present a negative value of the first predetermined value N1. The departure determination is performed until time t9. Then, the inter-vehicle distance control ECU 13 gradually increases the correction value N indicating a departure probability until time t10 when the correction value N is rendered to be zero.

The vehicle control apparatus according to the present embodiment provides the following advantageous effects with the above configuration.

When using the own lane probability S (parameter) that becomes higher as a vehicle comes closer to the path of the own vehicle 30 to determine whether other vehicle 50 traveling ahead of the own vehicle 30 is in the path of the own vehicle 30, the own lane probability S increases/decreases with the lateral relative movement of the own vehicle 30 or the other vehicle 50. The own lane probability S gradually increases/decreases. Thus, in determining whether the other vehicle 50 is in the path of the own vehicle 30, there may be a delay in the determination. In this regards, the vehicle control apparatus of the present embodiment adds or subtracts the own lane probability to/from S the correction value N when a lateral relative movement of the own vehicle 30 or the other vehicle 50 is detected. Thus, the vehicle control apparatus of the present embodiment can improve the responsiveness of the determination on whether other vehicle 50 is in the path of the own vehicle 30 when a lateral relative movement of the own vehicle 30 or the other vehicle 50 is detected.

In the vehicle control apparatus of the present embodiment, the correction value N is gradually changed when the detection of the lateral relative movement of the own vehicle 30 or other vehicle 50 is finished. Thus, the vehicle control apparatus of the present embodiment is ensured not to immediately perform the control of selecting or deselecting other vehicle 50 as being a preceding vehicle in finishing the vehicle's lateral movement.

In the vehicle control apparatus of the present embodiment, the first predetermined value N1 is set to a value smaller than the threshold Th. Thus, when a lateral relative movement has been made by other vehicle 50 located at a position where the own lane probability S is low on the probability map, the corrected probability S* is controlled so as not to immediately exceed the threshold Th, with the addition of the first predetermined value N1. In this way, the other vehicle 50 is prevented from being erroneously selected as a preceding vehicle.

<Second Embodiment>

A vehicle control apparatus according to the present embodiment has a general configuration common to the vehicle control apparatus of the first embodiment, but differs in part in the processing steps performed by the inter-vehicle distance control ECU 13. Further, the image acquisition device 12 of the present embodiment detects a lane separator line, such as a white line, drawn on the road ahead of the own vehicle 30, using an image (image of the road) captured by the imager 12*a*. In other words, the image acquisition device 12 of the present embodiment serves as a second detecting means detecting a lane separator line on the road which the own vehicle 30 travels. The white line, which is presented as an example of the lane separator line in the present embodiment, should not be taken as a limiting sense. The detection target is not limited to the white line, but may be lane separator lines of various colors. In addition, the lane separator line, such as a white line, as a detection target need not be necessarily a continuous line but may be a broken line or the like In the present embodiment, whether a lateral relative movement in the lane-entry or lane-departure direction of a vehicle has been made is determined based on whether the own vehicle 30 or other vehicle 50 has crossed over the white line. The reason why the lateral relative movement can be determined based on the above condition is that the behavior of the vehicle crossing over the white line is ascribed to the driver's operation of changing lanes (there is a high probability that the vehicle is changing lanes). Whether other vehicle 50 has crossed over the white line is determined based on whether part of the white line detected by the image acquisition device 12 has been blocked by the other vehicle 50. On the other hand, whether the own vehicle 30 has crossed over the white line is determined based on whether the detected white line is within a predetermined range near the path of the own vehicle 30.

Similarly to the first embodiment, the vehicle control apparatus of the present embodiment corrects the own lane probability S by adding the correction value N to the own lane probability S when the own vehicle 30 or other vehicle 50 has crossed over the white line. In this case, the correction value N is set to a second predetermined value N2 which is larger than the first predetermined value N1 (first predetermined value N1<second predetermined value N2). The occurrence of lateral relative movement in the lane-entry or lane-departure direction of a vehicle can be more accurately determined by determining whether a vehicle has crossed over the white line, than using the change in the relative positional relationship between the vehicles obtained based on the detection results of the radar device 11. Thus, in the present embodiment, the second predetermined value N2 used as the correction value N is made larger than the first predetermined value N in the case where the vehicle has crossed over the white line.

Figure 7:
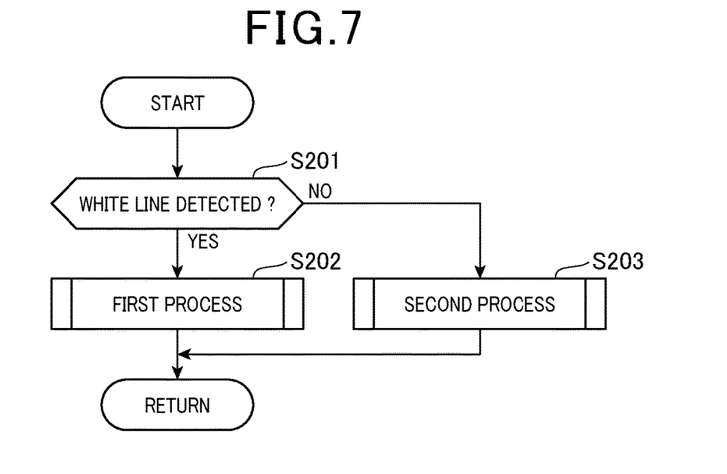
FIG. 7 is a flow diagram illustrating a process according to a second embodiment.

FIG. 7 is a flow diagram illustrating a process performed by the inter-vehicle distance control ECU 13 of the present embodiment. This process is performed for all of other vehicles 50 detected by the radar device 11, and repeated at a predetermined control cycle.

The vehicle control apparatus of the present embodiment determines first whether a white line has been detected by the image acquisition device 12 (S201). Then, if the vehicle control apparatus of the present embodiment determines that a white line has been detected by the image acquisition device 12 (YES in S201), the inter-vehicle distance control ECU 13 performs a first process (S202). Specifically, the inter-vehicle distance control ECU 13 performs a process (first process) of determining whether a lateral relative movement has been made in the lane-entry or lane-departure direction of a vehicle, on the basis of whether the own vehicle 30 or other vehicle 50 has crossed over the white line. If the vehicle control apparatus of the present embodiment determines that a white line has not been detected by the image acquisition device 12 (NO in S201), the inter-vehicle distance control ECU 13 performs a second process (S203). Specifically, the inter-vehicle distance control ECU 13 performs a process (second process) of determining whether a lateral relative movement has been made in the lane-entry or lane-departure direction of a vehicle, on the basis of the change in the lateral relative position of the own vehicle 30 and other vehicle 50. In the second process, processing steps similar to those shown in FIG. 5 referred to in the first embodiment are performed.

Figure 8:
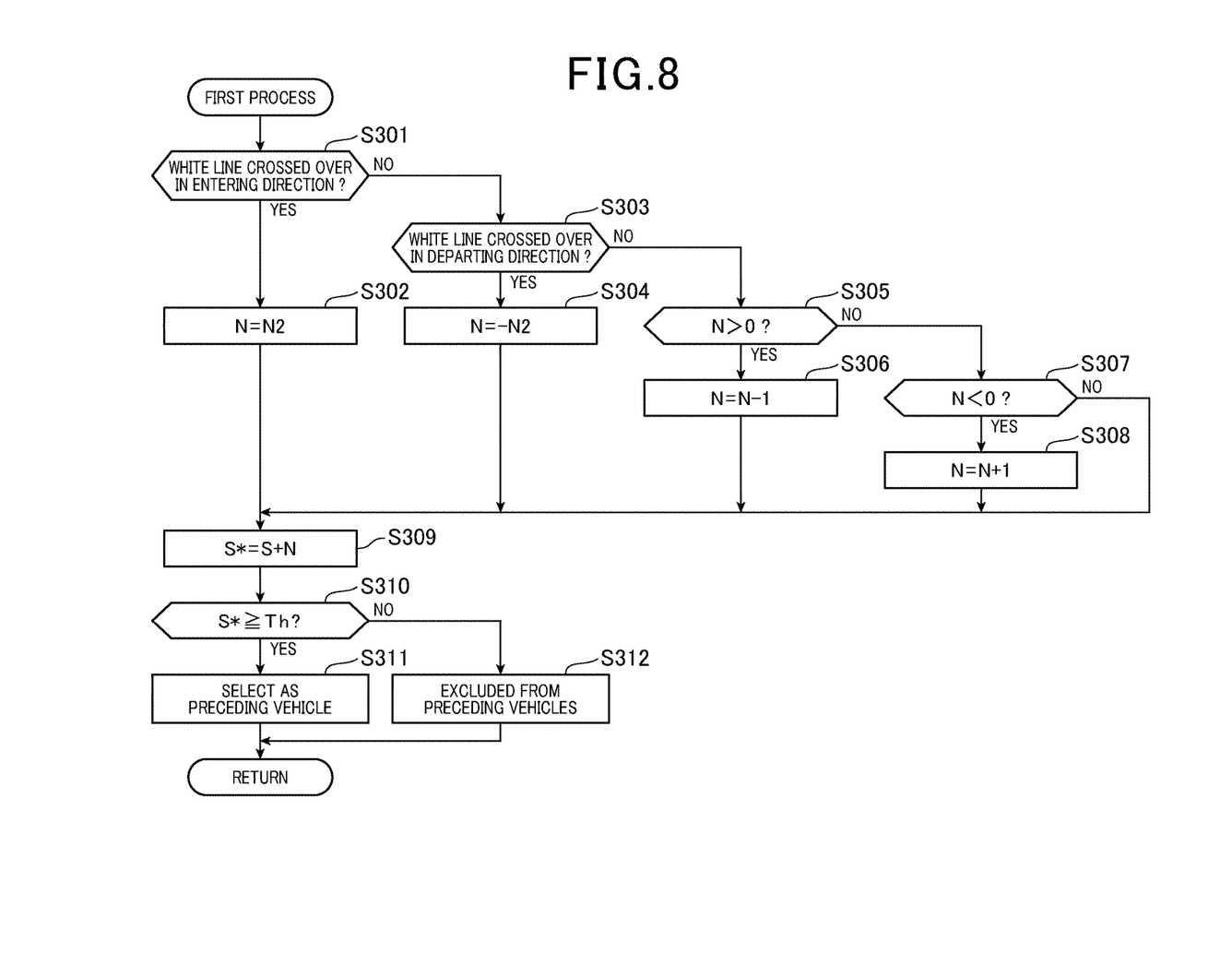
FIG. 8 is a flow diagram illustrating a subroutine of a first process.

FIG. 8 is a flow diagram illustrating a subroutine of the first process.

First, the inter-vehicle distance control ECU 13 of the present embodiment determines whether the own vehicle 30 or other vehicle 50 has crossed over the white line by making a lateral relative movement in the entering direction (S301). If it is determined that a vehicle has crossed over the white line by making a lateral movement in the entering direction (YES in S301), the inter-vehicle distance control ECU 13 sets the correction value N of the own lane probability S to the second predetermined value N2 (N=N2) (S302). If the same determination has been made in the previous control cycle, it means that the correction value N of the own lane probability S has been maintained at the second predetermined value N2. If it is determined that the vehicle has not crossed over the white line by making a lateral movement in the entering direction (NO in S301), the inter-vehicle distance control ECU 13 determines whether the own vehicle 30 or other vehicle 50 has crossed over the white line by making a lateral relative movement in the departing direction (S303). If it is determined that a vehicle has crossed over the white line by making a lateral movement in the departing direction (YES in S303), the inter-vehicle distance control ECU 13 sets the correction value N of the own lane probability S to a value with a sign inverse of the second predetermined value N2 (N=−N2) (S304).

If it is determined that the vehicle has not crossed over the white line by making a lateral movement in the departing direction (NO in S303), the inter-vehicle distance control ECU 13 determines whether the correction value N is larger than 0 (S305). If it is determined that the correction value N of the own lane probability S is larger than 0 (YES in S305), the inter-vehicle distance control ECU 13 reduces the correction value N of the own lane probability S (N=N−1) (S306). The reason why the process of S305 (reduction of the correction value N) is performed is that the period in which the correction value N of the own lane probability S is determined to be larger than 0 corresponds to the gradual reduction period of the correction value N which follows the determination that the vehicle has crossed over the white line by making a lateral movement in the entering direction. If it is determined that the correction value N of the own lane probability S is not larger than 0 (NO in S305), the inter-vehicle distance control ECU 13 determines whether the correction value N of the own lane probability S is smaller than 0 (S307). If it is determined that the correction value N of the own lane probability S is smaller than 0 (YES in S307), the inter-vehicle distance control ECU 13 increases the correction value N of the own lane probability S (N=N+1) (S308). The reason why the process of S308 (increase of the correction value N) is performed is that the period in which the correction value N of the own lane probability S is determined to be smaller than 0 corresponds to the gradual reduction period of the correction value N which follows the determination that the vehicle has crossed over the white line by making a lateral movement in the departing direction.

After determining (setting) the correction value N of the own lane probability S through the above processing steps, the inter-vehicle distance control ECU 13 adds the correction value N to the own lane probability S calculated using the probability map to thereby calculate a corrected probability S* (S*=S+N) (S309). The correction value N of the own lane probability S is a positive value during the period when the vehicle makes a lateral movement in the entering direction and is crossing over the white line, and in the gradual reduction period after the vehicle has crossed over the white line. Therefore, the corrected probability S* becomes larger than the own lane probability S (S*>S). On the other hand, since the correction value N of the own lane probability S is a negative value during the period when the vehicle makes a lateral movement in the departing direction and is crossing the white line, and in the gradual increase period after the vehicle has crossed over the white line, the corrected probability S* becomes smaller than the own lane probability S (S*<S).

Then, the inter-vehicle distance control ECU 13 compares the calculated corrected probability S* with the threshold Th and determines whether the corrected probability S* is equal to or greater than the threshold Th (S310). If it is determined that the corrected probability S* is equal to or greater than the threshold Th (YES in S310), the inter-vehicle distance control ECU 13 selects the other vehicle 50 corresponding to the corrected probability S* (selected target vehicle) as a preceding vehicle (S311). In the process of S311 (preceding vehicle selection), if a selection target vehicle has already been selected as a preceding vehicle, selection of that preceding vehicle is maintained. If it is determined that the corrected probability S* is smaller than the threshold Th (NO in S310), the inter-vehicle distance control ECU 13 excludes the other vehicle 50 corresponding to the corrected probability S* (excluded target vehicle) from preceding vehicles (S312). In the process of S312 (exclusion from preceding vehicles), if an exclusion target vehicle has not been selected as a preceding vehicle, the non-selected state is maintained. Thus, if the exclusion target vehicle has already been selected as a preceding vehicle in the process of S312, the exclusion target vehicle is excluded from preceding vehicles. The inter-vehicle distance control ECU 13 terminates the sequence of processing steps. The inter-vehicle distance control ECU 13 serves as a detecting means detecting whether a lateral relative movement has been made based on the result of determination as to whether at least one of the own vehicle 30 and other vehicle 50 has crossed over the white line, by performing the processing steps of S301 and S303. Further, if a lateral relative movement has been made, the inter-vehicle distance control ECU 13 serves as a correction means correcting a parameter (own lane probability S) indicating the lateral position of other vehicle 50 relative to the own vehicle 30, by performing the processing steps of S302 and S304 to S309. The inter-vehicle distance control ECU 13 serves as a determination means determining whether other vehicle 50 is in the path of the own vehicle 30 using a parameter (own lane probability S), by performing the process of S310.

The vehicle control apparatus of the present embodiment provides the following advantageous effects with the above configuration, in addition to the advantageous effects provided by the vehicle control apparatus of the first embodiment.

> When the own vehicle 30 or other vehicle 50 crosses over a lane separator line, such as a white line, there is a high probability that the own vehicle 30 or other vehicle 50 is changing lanes. In this regard, in the vehicle control apparatus of the present embodiment, when a lane separator line, such as a white line, is detected ahead of the own vehicle, it is determined whether the own vehicle 30 or other vehicle 50 is crossing over the white line, and if a vehicle is determined to be crossing over the white line, the second predetermined value N2 is added to the own lane probability S. Accordingly, the vehicle control apparatus of the present embodiment can improve the accuracy of determining a lateral relative movement of a vehicle in the lane-entry or lane-departure direction.

In the vehicle control apparatus of the present embodiment, when a white line is detected ahead of the own vehicle, a lateral relative movement of a vehicle in the lane-entry or lane-departure direction is determined, on the basis of whether a vehicle has crossed over the white line. On the other hand, if a white line has not been detected ahead of the own vehicle, a lateral relative movement of a vehicle in the lane-entry or lane-departure direction is determined, on the basis of the result of detection of the lateral relative positions of the vehicles. Accordingly, the vehicle control apparatus of the present embodiment can determine a lateral relative movement of a vehicle in the lane-entry or lane-departure direction regardless of the presence of a lane separator line, such as a white line, on the road. Further, the correction value N of the own lane probability S used when a white line has been detected ahead of the own vehicle is set to a value larger than the correction value N used when a white line has not been detected (first predetermined value N1<second predetermined value N2). Thus, the vehicle control apparatus of the present embodiment can improve the responsiveness to the control of selecting or deselecting other vehicle 50 as a preceding vehicle, when detecting a vehicle crossing over the white line in changing lanes.

<Modifications>

In the first embodiment, the same first predetermined value N1 is applied, as the correction value N of the own lane probability S, to both of the cases of detecting a lateral relative movement in the entering direction and of detecting a lateral relative movement in the departing direction. However, different values may be applied to the respective cases.

In the second embodiment, the first predetermined value N1 used as the correction value N of the own lane probability S in the case where a white line has not been detected ahead of the own vehicle is different from the second predetermined value N2 used as the correction value N in the case where a white line has been detected. However, these values may be the same.

The flow diagrams shown in the above embodiments are merely examples. Thus, the processing steps of the inter-vehicle distance control ECU 13 do not need to be performed in the order shown in the flow diagrams.

In the second embodiment, when a white line is detected ahead of the own vehicle, the first process is performed to determine the occurrence of a lateral relative movement of a vehicle in the lane-entry or lane-departure direction, on the basis of whether the own vehicle has crossed over the white line. Further, in the second embodiment, when a white line has not been detected ahead of the own vehicle, the second process is performed to determine the occurrence of a lateral relative movement of a vehicle in the lane-entry or lane-departure direction, on the basis of the result of detection of the lateral relative positions of the vehicles. Such a configuration of the second embodiment should not be taken as a limiting sense. For example, it may be so configured that the first process is performed when a white line is detected ahead of the own vehicle, and the second process is not performed when white line is not detected. That is, the vehicle control apparatus of the present modification may be configured to perform only the process of accurately determining entry or departure of other vehicle 50 into/from the own lane (the lane which the own vehicle 30 is traveling).

In a vehicle control apparatus that is a modification of the second embodiment, the correction value N of the own lane probability S is set to the first predetermined value N1 first, when a white line is detected ahead of the own vehicle and a lateral relative movement is determined to have been made by a vehicle. Further, the vehicle control apparatus of the present modification may be configured to set the correction value N to the second predetermined value N2, when detecting the fact of a vehicle crossing over the white line.

In a vehicle control apparatus that is a modification of the second embodiment, a positive value may be used as the correction value N of the own lane probability S, when the own vehicle 30 and other vehicle 50 are traveling in the same lane and both of the vehicles are detected as having crossed over the white line. It should be noted that both of the own vehicle 30 and other vehicle 50 crossing over the white line while traveling in the same lane means that they are both entering into the same lane. In the vehicle control apparatus of the present modification, when the own vehicle 30 and other vehicle 50 are traveling in the same lane, departure of one of the own vehicle 30 and the other vehicle 50 may be preferentially detected, and a negative value may be used as the correction value N of the own lane probability S. Further, under this condition, a process such as of not adding the correction value N may be performed.

REFERENCE SIGNS LIST

13 . . . Inter-vehicle distance control ECU, 30 . . . Own vehicle, 50 . . . Other vehicle, S . . . Own lane probability.

The invention claimed is:

1. A vehicle control apparatus mounted to an own vehicle to control the own vehicle according to a position of an other vehicle ahead of the own vehicle, comprising:
   a setting means for setting a parameter indicating a position of the other vehicle relative to the own vehicle in a lateral direction perpendicular to a path of the own vehicle;
   a determination means for determining whether the other vehicle is in the path of the own vehicle based on the parameter;
   a detection means for detecting a relative movement in the lateral direction by at least one of the own vehicle and the other vehicle; and
   a correction means correcting the parameter by adding a correction value so that an amount of change in the parameter is larger than an amount of change in the lateral direction due to the detected movement in response to detecting the relative movement in the lateral direction,
   wherein in response to a lane separator line being detected on a road on which the own vehicle is traveling, the detection means detects the relative movement in the lateral direction, based on a determination that the own vehicle or the other vehicle has crossed over the lane separator line, and in response to the lane separator line not being detected, the detection means detects the relative movement in the lateral direction, based on a change in a relative position of the own vehicle and the other vehicle in the lateral direction, and
   wherein in response to the relative movement in the lateral direction being detected based on the determination that the own vehicle or the other vehicle has crossed over the lane separator line, the correction value is made larger than when the lane separator line is not detected.

2. The vehicle control apparatus according to claim 1, wherein the setting means sets the parameter so as to have a larger value as a relative position of the other vehicle relative to the own vehicle in the lateral direction becomes closer to the path of the own vehicle than the relative position farther from the path of the own vehicle and sets the parameter so as to have a smaller value as the relative position of the other vehicle relative to the own vehicle in the lateral direction becomes farther from the path of the own vehicle than the relative position closer to the path of the own vehicle, and
the determination means determines that the other vehicle is in the path of the own vehicle when the parameter is equal to or greater than a threshold.

3. The vehicle control apparatus according to claim 2, wherein the correction means corrects the parameter by reducing an amount of correction of the parameter when a relative position of the other vehicle relative to the own vehicle in the lateral direction has changed so as to depart from a position of the own vehicle.

4. The vehicle control apparatus according to claim 2, wherein the correction means corrects the parameter by increasing an amount of correction of the parameter when a relative position of the other vehicle relative to the own vehicle in the lateral direction has changed so as to approach a position of the own vehicle.

5. The vehicle control apparatus according to claim 1, wherein the detection means detects a relative movement in the lateral direction, based on a result of determination as to whether the own vehicle or the other vehicle has crossed over a lane separator line on a road on which the own vehicle is traveling.

6. The vehicle control apparatus according to claim 1, wherein, when the detection means has finished detecting a relative movement in the lateral direction, the correction means reduces an amount of correction of the parameter.

7. The vehicle control apparatus according to claim 1, wherein, when the determination means has determined that the other vehicle is in a path of the own vehicle, the own vehicle is controlled to follow the determined other vehicle.

8. A vehicle control method for a vehicle control apparatus mounted to an own vehicle to control the own vehicle according to a position of other vehicle ahead of the own vehicle, comprising steps of:
setting a parameter indicating a position of the other vehicle relative to the own vehicle in a lateral direction perpendicular to a path of the own vehicle;
determining whether the other vehicle is in a path of the own vehicle based on the parameter;
detecting whether a relative movement in the lateral direction has been made by at least one of the own vehicle and the other vehicle; and
correcting the parameter by adding a correction value so that an amount of change in the parameter is larger than an amount of change in the lateral direction due to the detected movement when a relative movement in the lateral direction has been made, wherein
when a lane separator line on a road which the own vehicle is traveling has been detected, in the step of detecting, detects a relative movement in the lateral direction, based on a result of determination as to whether the own vehicle or the other vehicle has crossed over the lane separator line, and when the lane separator line has not been detected, detects a relative movement in the lateral direction, based on a change in a relative position of the own vehicle and the other vehicle in the lateral direction, and
when a relative movement in the lateral direction has been detected, in the step of correcting, increases an amount of correction of the parameter used when the lane separator line is detected is made larger than an amount of correction of the parameter used when the lane separator line is not detected.

9. A vehicle control apparatus mounted to an own vehicle to control the own vehicle according to a position of other vehicle ahead of the own vehicle, comprising:
a memory;
a processor communicable to the memory; and
a set of computer-executable instructions stored on the memory that cause the processor to implement:
setting a parameter indicating a position of the other vehicle relative to the own vehicle in a lateral direction perpendicular to a path of the own vehicle;
determining whether the other vehicle is in the path of the own vehicle based on the parameter;
detecting whether a relative movement in the lateral direction has been made by at least one of the own vehicle and the other vehicle; and
correcting the parameter by adding a correction value so that an amount of change in the parameter is larger than an amount of change in the lateral direction due to the detected movement when a relative movement in the lateral direction is detected, wherein
when a lane separator line on a road which the own vehicle is traveling has been detected, the processor detects a relative movement in the lateral direction, based on a result of determination as to whether the own vehicle or the other vehicle has crossed over the lane separator line, and when the lane separator line has not been detected, detects a relative movement in the lateral direction, based on a change in a relative position of the own vehicle and the other vehicle in the lateral direction, and
when a relative movement in the lateral direction has been detected, the processor increases an amount of correction of the parameter used when the lane separator line is detected is made larger than an amount of correction of the parameter used when the lane separator line is not detected.

10. A vehicle control apparatus mounted to an own vehicle to control the own vehicle according to a position of other vehicle ahead of the own vehicle, comprising:
a setting means setting a parameter indicating a position of the other vehicle relative to the own vehicle in a lateral direction perpendicular to a path of the own vehicle;
a determination means determining whether the other vehicle is in the path of the own vehicle based on the parameter;
a detection means detecting whether a relative movement in the lateral direction has been made by at least one of the own vehicle and the other vehicle; and
a correction means correcting the parameter by adding a correction value so that an amount of change in the parameter is larger than an amount of change in the lateral direction due to the detected movement when a relative movement in the lateral direction is detected.

* * * * *